US008750521B2

(12) United States Patent
Du et al.

(10) Patent No.: US 8,750,521 B2
(45) **Date of Patent: *Jun. 10, 2014**

(54) METHOD AND SYSTEM FOR STATION SWITCHING WHEN WIRELESS TERMINAL POINT COMPLETES WPI IN CONVERGENT WLAN

(75) Inventors: Zhiqiang Du, Shaanxi (CN); Jun Cao, Shaanxi (CN); Manxia Tie, Shaanxi (CN); Xiaolong Lai, Shaanxi (CN); Zhenhai Huang, Shaanxi (CN)

(73) Assignee: China Iwncomm Co., Ltd., Shaanxi (CN)

(*) Notice: Subject to any disclaimer, the term of this patent is extended or adjusted under 35 U.S.C. 154(b) by 126 days.

This patent is subject to a terminal disclaimer.

(21) Appl. No.: 13/320,496

(22) PCT Filed: Dec. 14, 2009

(86) PCT No.: PCT/CN2009/075564

§ 371 (c)(1),
(2), (4) Date: Nov. 15, 2011

(87) PCT Pub. No.: WO2010/130132

PCT Pub. Date: Nov. 18, 2010

(65) Prior Publication Data

US 2012/0060205 A1 Mar. 8, 2012

(30) Foreign Application Priority Data

May 14, 2009 (CN) .......................... 2009 1 0022521

(51) Int. Cl.

| | |
|---|---|
| ***H04L 9/00*** | (2006.01) |
| ***H04L 9/08*** | (2006.01) |
| ***H04L 29/06*** | (2006.01) |
| *G06F 21/10* | (2013.01) |
| *H04W 12/02* | (2009.01) |
| *H04W 12/04* | (2009.01) |

(52) U.S. Cl.

CPC ................ *H04L 9/08* (2013.01); *H04L 63/205* (2013.01); *G06F 21/10* (2013.01); *H04W 12/02* (2013.01); *H04W 12/04* (2013.01); *H04L 9/0838* (2013.01)

USPC ........... 380/277; 380/270; 380/278; 380/255; 455/410; 455/411

(58) Field of Classification Search

CPC ............. H04L 9/08; H04L 9/083; H04L 9/00; H04L 9/0816; H04L 9/0838; H04L 9/0819; H04L 9/12; H04L 9/0883; H04L 63/0428; H04L 63/205; H04K 1/00; H04W 12/02; H04W 12/06; H04W 12/04; G06F 21/10; G06F 21/43

USPC ................... 380/255, 270, 277; 455/410, 411

See application file for complete search history.

(56) References Cited

U.S. PATENT DOCUMENTS

| | | | | |
|---|---|---|---|---|
| 7,133,526 | B2 * | 11/2006 | Whelan et al. | 380/270 |
| 8,223,727 | B2 * | 7/2012 | Mitsuhori | 370/338 |
| 8,306,229 | B2 * | 11/2012 | Pang et al. | 380/278 |
| 8,370,296 | B2 * | 2/2013 | Tian | 707/610 |
| 8,441,983 | B2 * | 5/2013 | Calhoun et al. | 370/328 |
| 2002/0085719 | A1 * | 7/2002 | Crosbie | 380/248 |
| 2005/0036471 | A1 * | 2/2005 | Singh et al. | 370/338 |
| 2006/0187878 | A1 * | 8/2006 | Calhoun et al. | 370/331 |
| 2007/0076612 | A1 * | 4/2007 | Iyer et al. | 370/235 |
| 2007/0104126 | A1 * | 5/2007 | Calhoun et al. | 370/328 |
| 2009/0013378 | A1 * | 1/2009 | Zhang et al. | 726/1 |
| 2010/0322423 | A1 * | 12/2010 | Boehler et al. | 380/255 |
| 2012/0017088 | A1 * | 1/2012 | Liu et al. | 713/171 |
| 2012/0054831 | A1 * | 3/2012 | Du et al. | 726/3 |
| 2012/0060205 | A1 * | 3/2012 | Tie et al. | 726/3 |
| 2012/0102328 | A1 * | 4/2012 | Hui et al. | 713/175 |

FOREIGN PATENT DOCUMENTS

| | | | |
|---|---|---|---|
| CN | 1564626 | A | 1/2005 |
| CN | 1756412 | A | 4/2006 |
| CN | 1996840 | A | 7/2007 |
| CN | 101079891 | A | 11/2007 |
| CN | 101155396 | A | 4/2008 |
| CN | 101272308 | A | 9/2008 |

| | | | |
|---|---|---|---|
| CN | 101282352 | A | 10/2008 |
| CN | 101335666 | A | 12/2008 |
| CN | 101366291 | A | 2/2009 |
| CN | 101557592 | A | 10/2009 |
| CN | 101562811 | A | 10/2009 |
| CN | 101562812 | A | 10/2009 |
| CN | 101562811 | B | 4/2011 |
| CN | 101562812 | B | 6/2011 |

OTHER PUBLICATIONS

Int'l. Search Report issued in Int'l App. No. PCT/CN2009/075564 mailed Mar. 18, 2010.

Chinese Office Action issued in CN 200910022521.6 dated May 12, 2010.

Xiao-Long et al.; "An 802 11i Robust Security Network Authentication Protocol of Roaming"; Chinese Journal of Computers; vol. 28, No. 12; pp. 2027-2035; Dec. 2005.

Review of WAPI; China Academic Journal Electronic Publishing House; http://www.cnki.net; pp. 31-36.

Int'l. Search Report issued in Int'l. App. No. PCT/CN2009/075354 mailed Mar. 11, 2010.

Chinese Office Action issued in CN 200910022522.0 dated Jul. 29, 2010.

Introduction of WAPI; GB 15629.11-2003/XG1; pp. 1-203 (with English translation for the relevant part (i.e. Section 8) of Introduction of WAPI).

* cited by examiner

*Primary Examiner* — Nirav B Patel

(74) *Attorney, Agent, or Firm* — Greer, Burns & Crain Ltd.

(57) ABSTRACT

The invention involves a method and a system for station (STA) switching when a wireless terminal point (WTP) completes wireless local area network (WLAN) privacy infrastructure (WPI) in a convergent WLAN. The method includes steps as follows. The STA implements re-association rebinding process with a target access controller (AC) over a target WTP. A base key is requested by the target AC from an associated AC. An associated WTP is informed to delete the STA by the associated AC, and the target WTP is informed to add the STA by the target AC. A session key is negotiated based on the requested base key by the STA and the target AC, and is synchronized between the target AC and the target WTP. The method enables fast and safe switching of the STA between WTPs under the control of different controllers in the convergent WLAN based on WAPI protocol.

20 Claims, 1 Drawing Sheet

METHOD AND SYSTEM FOR STATION SWITCHING WHEN WIRELESS TERMINAL POINT COMPLETES WPI IN CONVERGENT WLAN

This application is a US National Stage of International Application No. PCT/CN2009/075564, filed Dec. 14, 2009, designating the United States, and claiming the benefit of Chinese Patent Application No. 200910022521.6, filed with the Chinese Patent Office on May 14, 2009 and entitled "Method and system for switching station in WPI performed by WTPs in converged WLAN", both of which are hereby incorporated by reference in their entirety.

FIELD

The present invention relates to the field of communications and particularly to a method and system for switching a station (simply STA) in a Wireless Local Area Network (WLAN) Privacy Infrastructure (simply WPI) performed by Wireless Terminal Points (simply WTPs) in a converged WLAN.

BACKGROUND

At present in a WLAN based upon the protocol of Wireless Local Area Network (WLAN) Authentication and Privacy Infrastructure (simply WAPI), all the methods for switching an STA have been proposed in an autonomous WLAN architecture but can not be applicable directly to a converged WLAN architecture based upon the WAPI protocol.

In the converged WLAN architecture, authentication and policy enforcement functions of the WLAN are managed centrally by an access control device, e.g., an Access Controller (simply AC), a wireless switch, a wireless router, etc., which can further offer functions of centralized bridging, user data forwarding, etc.

SUMMARY

Embodiments of the invention provide a method and system for switching a station in a WPI performed by wireless terminal points in a converged WLAN to address the drawback of the prior art that the methods for switching a STA in the existing WLAN based upon the WAPI protocol is applicable only to an autonomous architecture, thereby switching a STA between WTPs under different ACs in a WPI performed by the WTPs in a converged WLAN architecture. The AC here may also be replaced with such a device as a wireless switch, a wireless router, etc.

An embodiment of the invention provides a method for switching a station in a WPI performed by wireless terminal points in a converged WLAN, which is a method for switching a station between wireless terminal points under different access controllers, wherein the method includes:

an operation 1 of re-associating a station with a destination access controller through a destination wireless terminal point;

an operation 2 of the destination access controller requesting an associated access controller for a Base Key (simply BK);

an operation 3 of the associated access controller instructing an associated wireless terminal point to delete the station;

an operation 4 of the destination access controller instructing the destination wireless terminal point to add the station;

an operation 5 of the station and the destination access controller negotiating about a session key based upon the requested base key; and an operation 6 of synchronizing the session key between the destination access controller and the destination wireless terminal point.

A specific implementation of the operation 1 is as follows:

an operation 11 of the station acquiring relevant parameters of the destination wireless terminal point including WAPI information elements which include suites of authentication and key management and suites of ciphers supported by the destination wireless terminal point;

the operation 11 may particularly include:

the station listening passively to a beacon frame of the destination wireless terminal point and acquiring the relevant parameters of the destination wireless terminal point including the WAPI information elements which include the suites of authentication and key management and the suites of ciphers supported by the destination wireless terminal point; or the station transmitting actively a probe request frame to the destination wireless terminal point, which in turn transmits a probe response frame to the station upon reception of the probe request frame of the station, and the station acquiring the relevant parameters of the destination wireless terminal point including the WAPI information elements which include the suites of authentication and key management and the suites of ciphers supported by the destination wireless terminal point upon reception of the probe response frame.

an operation 12 of the station authenticating a link;

the operation 12 may particularly include:

in a local Medium Access Control (simply MAC) mode, the station transmitting a link authentication request frame to the destination wireless terminal point to request for authenticating a link to the destination wireless terminal point, and the destination wireless terminal point transmitting a link authentication response frame to the station in response to the link authentication request frame of the station; or in a separate MAC mode, the station transmitting a link authentication request frame to the destination access controller to request for authenticating a link to the destination access controller, and the destination access controller transmitting a link authentication response frame to the station in response to the link authentication request frame of the station.

an operation 13 of the station, upon successful authentication of the link, the station transmitting a re-association request frame to the destination access controller to request for being re-associated with the destination access controller by including the identifier of the currently associated wireless terminal point, the identifier of the associated access controller and the WAPI information elements in the re-association request frame to determine a suite of authentication and key management and a suite of ciphers selected by the station, which are preferably the same as a suite of authentication and key management and a suite of ciphers selected by the STA upon association with the associated access controller, and the destination access controller parsing the re-association request frame of the station and transmitting a re-association response frame to the station.

A specific implementation of the operation 2 is as follows:

an operation 21 of the destination access controller transmitting base key request information including station deletion information to the associated access controller on a secure channel pre-established with the associated access controller; and an operation 22 of the associated access controller transmitting a base key to the destination access controller in response to the base key request information of the destination access controller on the secure channel with the destination access controller, wherein the base key transmitted to the destination access controller is either equivalent to a base key between the station and the associated access controller or calculated from extension parameters in a unidirectional function using the base key between the station and the associated access controller, and the extension parameters are parameters known in advance to the station and the destination access controller.

A specific implementation of the operation 3 is as follows:

an operation 31 of the associated access controller transmitting a Control And Provisioning of Wireless Access Point (simply CAPWAP)-protocol station configuration request message including a message element of Delete station to the associated wireless terminal point in response to the station deletion information in the base key request information of the destination access controller; and an operation 32 of the associated wireless terminal point transmitting to the associated access controller a CAPWAP station configuration response message including a message element of Result Code indicating a result of processing the CAPWAP station configuration request message.

A specific implementation of the operation 4 is as follows:

an operation 41 of the destination access controller transmitting to the destination wireless terminal point a CAPWAP station configuration request message including message elements of Add Station, WAPI Add Station and WAPI Station Session Key, wherein a flag bit "A" in the WAPI Station Session Key is set to 1 to instruct the destination wireless terminal point to disable a controlled port and forward only Wireless Local Area Network (WLAN) Authentication Infrastructure (simply WAI) protocol data from the corresponding station; and an operation 42 of the destination wireless terminal point transmitting to the destination access controller a CAPWAP station configuration response message including a message element of Result Code indicating a result of processing the CAPWAP station configuration request message.

A specific implementation of the operation 5 is as follows:

an operation 51 of the destination access controller and the station negotiating about a WAI uni-cast key based upon the base key requested from the associated access controller, which includes: the destination wireless terminal point de-encapsulating WAI uni-cast key negotiation data from the destination access controller encapsulated in a CAPWAP data encapsulation format and then forwarding it to the station STA, and encapsulating WAI uni-cast key negotiation data from the station in the CAPWAP data encapsulation format and then forwarding to the destination access controller; and an operation of 52 the destination access controller and the station announcing a WAI multi-cast key, which includes: the destination wireless terminal point de-encapsulating WAI multi-cast key announcement data from the destination access controller encapsulated in the CAPWAP data encapsulation format and then forwarding it to the station, and encapsulating WAI multi-cast key announcement data from the station in the CAPWAP data encapsulation format and then forwarding it to the destination access controller.

A specific implementation of the operation 6 is as follows:

an operation 61 of the destination access controller transmitting to the destination wireless terminal point a CAPWAP station configuration request message including message elements of Add station, WAPI Add station, WAPI Station Session Key and WAPI information element, and according to the MAC address of the station in the message element of Add Station, the destination wireless terminal point enabling a controlled port corresponding thereto and forwarding all the data including WAI protocol data and non-WAI protocol data from the station; and an operation 62 of the destination wireless terminal point transmitting to the destination access controller a CAPWAP station configuration response message including a message element of Result Code indicating a result of processing the CAPWAP station configuration request message.

A system for switching an station in a WPI performed by wireless terminal points in a converged WLAN, which includes a destination access controller, an associated access controller, a destination wireless terminal point, an associated wireless terminal point and a station, wherein the station is re-associated with the destination access controller through the destination wireless terminal point; the destination access controller requests a base key from the associated access controller; the associated access controller instructs the associated wireless terminal point to delete the station; the destination access controller instructs the destination wireless terminal point to add the station; the station and the destination access controller negotiate about a session key based upon the requested base key; and the session key is synchronized between the destination access controller and the destination wireless terminal point.

Embodiments of the invention provide a method and system for switching a station in a WPI performed by WTPs in a converged WLAN architecture based upon the WAPI protocol, where a base key resulting from negotiation between an STA and an AC through a WAI is buffered so that a session key between the STA and a destination WTP is generated from the buffered BK during switching of the STA, and operations of adding the station, removing the station and synchronizing the key between the AC and the WTP are performed in CAPWAP control messages, thereby proposing a flow of switching an STA rapidly and securely between WTPs under different ACs in a converged WLAN architecture based upon the WAPI protocol. The invention has the following advantage: the invention proposes a method for switching a station in a WPI performed by WTPs in a converged WLAN to switch the STA rapidly and securely between WTPs under different ACs in CAPWAP control messages based upon a buffered base key resulting from negotiation between the STA and an AC.

DETAILED DESCRIPTION

According to the invention, a BK resulting from negotiation between an STA and an AC through a WAI is buffered so that a session key between the STA and a destination WTP is generated from the buffered BK during switching of the STA, and operations of adding the STA, removing the STA and synchronizing the key between the AC and the WTP are performed in CAPWAP control messages, thereby proposing a flow of switching an STA rapidly and securely between WTPs under different ACs in a converged WLAN architecture based upon the WAPI protocol, where the ACs may be arranged in parallel or in hierarchy and will not be to ACs but can alternatively be such devices as wireless switches, wireless routers, etc. The following description will be presented taking an AC as an example.

Figure 1:
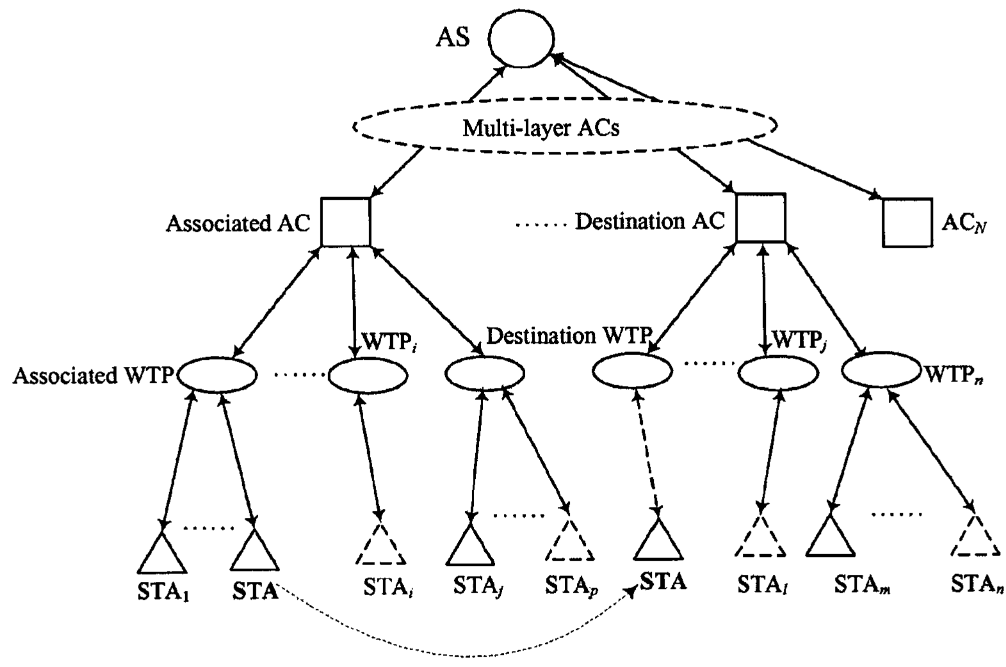
FIG. 1 is a schematic diagram of switching a station according to the invention.
Figure 2:
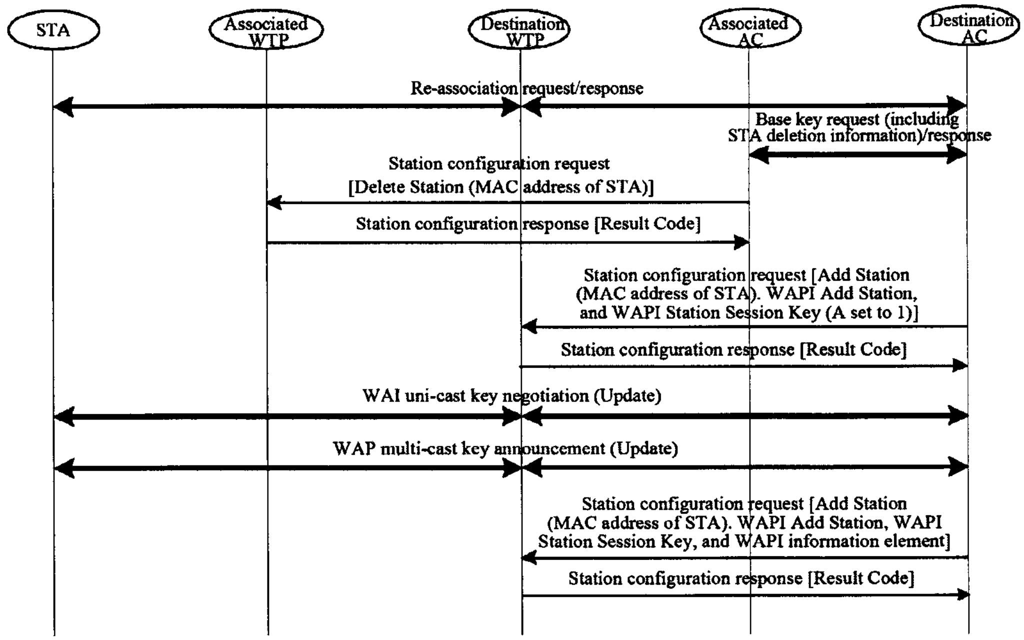
FIG. 2 is a flow chart of a method for switching a station according to the invention.

Referring to FIG. 2, the invention provides a method for switching an STA between different WTPs under different ACs, which in a preferred embodiment of the invention includes the following operations 1 to 6.

In the operation 1, an STA is re-associated with a destination AC through a destination WTP.

The operation 1 may particularly include the following operations 11 to 13.

In the operation 11, the STA acquires relevant parameters of the destination WTP including WAPI information elements which include suites of authentication and key management, suites of ciphers, etc., supported by the destination WTP.

In the operation 11, the STA can listen passively to a beacon frame of the destination WTP and acquires the relevant parameters of the destination WTP including the WAPI information elements; or the STA can alternatively transmit actively a probe request frame to the destination WTP, which in turn transmits a probe response frame to the STA upon reception of the probe request frame of the STA, and the STA can acquire the relevant parameters of the destination WTP including the WAPI information elements upon reception of the probe response frame.

In the operation 12, the STA authenticates a link.

Particularly the operation 12 may include the following operations:

in a local MAC mode, the STA transmits a link authentication request frame to the destination WTP to request for authenticating a link to the destination WTP, and the destination WTP transmits a link authentication response frame to the STA in response to the link authentication request frame of the STA; or in a separate MAC mode, the STA transmits a link authentication request frame to the destination AC to request for authenticating a link to the destination AC, and the destination AC transmits a link authentication response frame to the STA in response to the link authentication request frame of the STA.

In the operation 13, upon successful authentication of the link, the STA transmits a re-association request frame to the destination AC to request for being re-associated with the destination AC by including the identifier of a currently associated WTP, the identifier of an associated AC and the WAPI information elements in the re-association request frame to determine a suite of authentication and key management, a suite of ciphers, etc., selected by the STA, which are preferably the same as a suite of authentication and key management and a suite of ciphers selected by the STA upon initial association with the AC, and the destination AC parses the re-association request frame of the STA and transmits a re-association response frame to the STA.

In the operation 2, the destination AC requests the associated AC for a BK or an Extended BK (simply EBK).

The operation 2 may particularly include the following operations 21 and 22.

In the operation 21, the destination AC transmits BK request information or EBK request information including STA deletion information to the associated AC on a secure channel pre-established with the associated AC.

In the operation 22, the associated AC transmits a BK or an EBK to the destination AC, in response to the BK request information or the EBK request information of the destination AC, on the secure channel with the destination AC, where the BK is equivalent to a BK between the STA and the associated AC, and the EBK is calculated from extension parameters in a unidirectional function using the base key between the STA and the associated AC, i.e., EBK=F(BK, Extension Parameters), where the extension parameters are parameters known in advance to the STA and the destination AC, e.g., their MAC addresses, etc., and F represents the unidirectional function.

In the operation 3, the associated AC instructs the associated WTP to delete the STA.

The operation 3 may particularly include the following operations 31 and 32.

In the operation 31, the associated AC transmits a CAPWAP station configuration request message including a message element of Delete Station to the associated WTP according to the STA deletion information in the BK request information or the EBK request information of the destination AC.

In the operation 32, the associated WTP transmits to the associated AC a CAPWAP station configuration response message including a message element of Result Code indicating a result of processing the CAPWAP station configuration request message.

In the operation 4, the destination AC instructs the destination WTP to add the STA.

The operation 4 may particularly include the following operations 41 and 42.

In the operation 41, the destination AC transmits to the destination WTP a CAPWAP station configuration request message including message elements of Add Station, WAPI Add Station and WAPI Station Session Key, where a flag bit "A" in the WAPI Station Session Key is set 1 to instruct the destination WTP to disable a controlled port and forward only WAI protocol data from the corresponding STA.

In the operation 42, the destination WTP transmits to the destination AC a CAPWAP station configuration response message including a message element of Result Code indicating a result of processing the CAPWAP station configuration request message.

In the operation 5, the STA and the destination AC negotiate about a session key based upon the requested BK or EBK.

The operation 5 may particularly include the following operations 51 and 52.

In the operation 51, the destination AC and the STA negotiate about a WAI uni-cast key based upon the requested BK or EBK, which includes: the destination WTP de-encapsulates and then forwards WAI uni-cast key negotiation data from the destination AC encapsulated in a CAPWAP data encapsulation format to the STA, and encapsulates and then forwards WAI uni-cast key negotiation data from the STA in the CAPWAP data encapsulation format to the destination AC.

In the operation 52, the destination AC and the STA announce a WAI multi-cast key, which includes: the destination WTP de-encapsulates and then forwards WAI multi-cast key announcement data from the destination AC encapsulated in the CAPWAP data encapsulation format to the STA, and encapsulates and then forwards WAI multi-cast key announcement data from the STA in the CAPWAP data encapsulation format to the destination AC.

In the operation 6, the session key is synchronized between the destination AC and the destination WTP.

The operation 6 may particularly include the following operations 61 and 62.

In the operation 61, the destination AC transmits to the destination WTP a CAPWAP station configuration request message including message elements of Add Station, WAPI Add Station, WAPI Station Session Key and WAPI information element, and the destination WTP enables the controlled port corresponding to the STA according to the MAC address of the STA in the message element of Add Station and forwards all the data including WAI protocol data and non-WAI protocol data from the STA.

In the operation 62, the destination WTP transmits to the destination AC a CAPWAP station configuration response message including a message element of Result Code indicating a result of processing the CAPWAP station configuration request message.

The invention further provides a system for switching an STA in a WPI performed by WTPs in a converged WLAN, which includes a destination access controller, an associated access controller, a destination wireless terminal point, an associated wireless terminal point and a station, where the station is re-associated with the destination access controller through the destination wireless terminal point; the destination access controller requests a base key from the associated access controller; the associated access controller instructs the associated wireless terminal point to delete the station; the destination access controller instructs the destination wireless terminal point to add the station; the station and the destination access controller negotiate about a session key based upon the requested base key; and the session key is synchronized between the destination access controller and the destination wireless terminal point.

The system for switching a station may include corresponding functional modules to perform the method for switching a station according to the invention.

Those ordinarily skilled in the art can appreciate that all or a part of the operations in the embodiment of the method can be performed by program instructing relevant hardware, which can be stored in a computer readable storage medium and which upon execution can perform the operations including the embodiment of the method, where the storage medium includes various mediums, e.g., an ROM, an RAM, a magnetic disk, an optical disk, etc., capable of storing program codes.

Lastly it shall be noted that the foregoing embodiments are merely intended to illustrate but not limit the technical solutions of the invention, and although the invention has been detailed in connection with the embodiments, those ordinarily skilled in the art shall appreciate that they still can modify the technical solutions according to the respective embodiments or made equivalent substitutions of a part of the technical features thereof and that these modifications and substitutions will not make the essence of corresponding technical solutions depart from the scope of the respective embodiments of the invention.

The invention claimed is:

1. A method for switching a station in a Wireless local area network Privacy Infrastructure, WPI, performed by wireless terminal points in a converged Wireless Local Area Network, WLAN, wherein before the switching, the station is associated with one access controller through one wireless terminal point, after the switching, the station is associated with another one access controller through another one wireless terminal, the one access controller is referred to as an associated access controller, the another one access controller is referred to as a destination access controller, the one wireless terminal point is referred to as an associated wireless terminal point, the another one wireless terminal point is referred to as a destination wireless terminal point, and the method comprises:

re-associating the station with the destination access controller through the destination wireless terminal point;

the destination access controller requesting the associated access controller for a base key;

the associated access controller instructing the associated wireless terminal point to delete the station;

the destination access controller instructing the destination wireless terminal point to add the station;

the station and the destination access controller negotiating about a session key based upon the requested base key; and synchronizing the session key between the destination access controller and the destination wireless terminal point;

wherein the destination access controller requesting the associated access controller for a base key comprises:

the destination access controller transmitting base key request information comprising station deletion information to the associated access controller on a secure channel pre-established with the associated access controller; and the associated access controller transmitting a base key to the destination access controller, in response to the base key request information of the destination access controller, on the secure channel with the destination access controller, wherein the transmitted base key is equivalent to a base key between the station and the associated access controller or calculated from extension parameters in a unidirectional function using the base key between the station and the associated access controller, and the extension parameters are parameters known in advance to the station and the destination access controller.

2. The method for switching the station according to claim 1, wherein the re-associating the station with the destination access controller through the destination wireless terminal point comprises:

step 1, the station acquiring relevant parameters of the destination wireless terminal point comprising WLAN Authentication and Privacy Infrastructure, WAPI, information elements which include suites of authentication and key management and suites of ciphers supported by the destination wireless terminal point;

step 2, the station authenticating a link; and step 3, the station, upon successful authentication of the link, transmitting a re-association request frame to the destination access controller to request for being re-associated with the destination access controller by comprising the identifier of the currently associated wireless terminal point, the identifier of the associated access controller and the WAPI information elements in the re-association request frame to determine a suite of authentication and key management and a suite of ciphers selected by the station, and the destination access controller parsing the re-association request frame of the station and transmitting a re-association response frame to the station, and wherein the step 1 comprises:

the station listening passively to a beacon frame of the destination wireless terminal point and acquiring the relevant parameters of the destination wireless terminal point comprising the WAPI information elements; or the station transmitting actively a probe request frame to the destination wireless terminal point, which in turn transmits a probe response frame to the station upon reception of the probe request frame of the station, and the station acquiring the relevant parameters of the destination wireless terminal point comprising the WAPI information elements upon reception of the probe response frame.

3. The method for switching the station according to claim 1, wherein the re-associating the station with the destination access controller through the destination wireless terminal point comprises:

step 1, the station acquiring relevant parameters of the destination wireless terminal point comprising WLAN Authentication and Privacy Infrastructure, WAPI, information elements which include suites of authentication and key management and suites of ciphers supported by the destination wireless terminal point;

step 2, the station authenticating a link; and step 3, the station, upon successful authentication of the link, transmitting a re-association request frame to the destination access controller to request for being re-associated with the destination access controller by comprising the identifier of the currently associated wireless terminal point, the identifier of the associated access controller and the WAPI information elements in the re-association request frame to determine a suite of authentication and key management and a suite of ciphers selected by the station, and the destination access controller parsing the re-association request frame of the station and transmitting a re-association response frame to the station, and wherein the step 2 comprises:

in a local Medium Access Control, MAC, mode, the station transmitting a link authentication request frame to the destination wireless terminal point to request for authenticating a link to the destination wireless terminal point, and the destination wireless terminal point transmitting a link authentication response frame to the station in response to the link authentication request frame of the station; or in a separate MAC mode, the station transmitting a link authentication request frame to the destination access controller to request for authenticating a link to the destination access controller, and the destination access controller transmitting a link authentication response frame to the station in response to the link authentication request frame of the station.

4. The method for switching the station according to claim 1, wherein the re-associating the station with the destination access controller through the destination wireless terminal point comprises:

step 1, the station acquiring relevant parameters of the destination wireless terminal point comprising WLAN Authentication and Privacy Infrastructure, WAPI, information elements which include suites of authentication and key management and suites of ciphers supported by the destination wireless terminal point;

step 2, the station authenticating a link; and step 3, the station, upon successful authentication of the link, transmitting a re-association request frame to the destination access controller to request for being re-associated with the destination access controller by comprising the identifier of the currently associated wireless terminal point, the identifier of the associated access controller and the WAPI information elements in the re-association request frame to determine a suite of authentication and key management and a suite of ciphers selected by the station, and the destination access controller parsing the re-association request frame of the station and transmitting a re-association response frame to the station, and wherein in the step 3, the suite of authentication and key management and the suite of ciphers, selected by the station, are the same as a suite of authentication and key management and a suite of ciphers selected by the station upon association with the associated access controller.

5. The method for switching the station according to claim 1, wherein the associated access controller instructing the associated wireless terminal point to delete the station comprises:

the associated access controller transmitting a Control And Provisioning of Wireless Access Point, CAPWAP, station configuration request message comprising a message element of Delete station to the associated wireless terminal point according to the station deletion information in the base key request information of the destination access controller; and the associated wireless terminal point transmitting to the associated access controller a CAPWAP station configuration response message comprising a message element of Result Code indicating a result of processing the CAPWAP station configuration request message.

6. The method for switching the station according to claim 1, wherein the destination access controller instructing the destination wireless terminal point to add the station comprises:

the destination access controller transmitting to the destination wireless terminal point a Control And Provisioning of Wireless Access Point, CAPWAP, station configuration request message comprising message elements of Add Station, WAPI Add Station and WAPI Station Session Key, wherein a flag bit "A" in the WAPI Station Session Key is set to 1 to instruct the destination wireless terminal point to disable a controlled port and forward only WLAN Authentication Infrastructure, WAI, protocol data from the corresponding station; and the destination wireless terminal point transmitting to the destination access controller a CAPWAP station configuration response message comprising a message element of Result Code indicating a result of processing the CAPWAP station configuration request message.

7. The method for switching the station according to claim 1, wherein the station and the destination access controller negotiating about a session key based upon the requested base key comprises:

the destination access controller and the station negotiating about a WLAN Authentication Infrastructure, WAI, uni-cast key based upon the base key requested from the associated access controller, which comprises: the destination wireless terminal point de-encapsulates and then forwards WAI uni-cast key negotiation data from the destination access controller encapsulated in a Control And Provisioning of Wireless Access Point, CAPWAP, data encapsulation format to the station, and encapsulates and then forwards WAI uni-cast key negotiation data from the station in the CAPWAP data encapsulation format to the destination access controller; and the destination access controller and the station announcing a WAI multi-cast key, which comprises: the destination wireless terminal point de-encapsulates and then forwards WAI multi-cast key announcement data from the destination access controller encapsulated in the CAPWAP data encapsulation format to the station, and encapsulates and then forwards WAI multi-cast key announcement data from the station in the CAPWAP data encapsulation format to the destination access controller.

8. The method for switching the station according to claim 1, wherein the synchronizing the session key between the destination access controller and the destination wireless terminal point comprises:

the destination access controller transmitting to the destination wireless terminal point a Control And Provisioning of Wireless Access Point, CAPWAP, station configuration request message comprising message elements of Add station, WAPI Add Station, WAPI Station Session Key and WAPI information element, and the destination wireless terminal point enabling a controlled port corresponding to the station according to the MAC address of the station in the message element of Add Station and forwarding all the data comprising WLAN Authentication Infrastructure, WAI, protocol data and non-WAI protocol data from the station; and the destination wireless terminal point transmitting to the destination access controller a CAPWAP station configuration response message comprising a message element of Result Code indicating a result of processing the CAPWAP station configuration request message.

9. A method for switching a station in a Wireless local area network Privacy Infrastructure, WPI, performed by wireless terminal points in a converged Wireless Local Area Network, WLAN, comprising:

re-associating the station with a destination access controller through a destination wireless terminal point;

the destination access controller requesting an associated access controller for a base key;

the associated access controller instructing an associated wireless terminal point to delete the station;

the destination access controller instructing the destination wireless terminal point to add the station;

the station and the destination access controller negotiating about a session key based upon the requested base key; and synchronizing the session key between the destination access controller and the destination wireless terminal point;

wherein the re-associating the station with a destination access controller through a destination wireless terminal point comprises:

step 1, the station acquiring relevant parameters of the destination wireless terminal point comprising WLAN Authentication and Privacy Infrastructure, WAPI, information elements which include suites of authentication and key management and suites of ciphers supported by the destination wireless terminal point;

step 2, the station authenticating a link; and step 3, the station, upon successful authentication of the link, transmitting a re-association request frame to the destination access controller to request for being re-associated with the destination access controller by comprising the identifier of the currently associated wireless terminal point, the identifier of the associated access controller and the WAPI information elements in the re-association request frame to determine a suite of authentication and key management and a suite of ciphers selected by the station, and the destination access controller parsing the re-association request frame of the station and transmitting a re-association response frame to the station.

10. The method for switching the station according to claim 9, wherein the step 2 comprises:

the station listening passively to a beacon frame of the destination wireless terminal point and acquiring the relevant parameters of the destination wireless terminal point comprising the WAPI information elements; or the station transmitting actively a probe request frame to the destination wireless terminal point, which in turn transmits a probe response frame to the station upon reception of the probe request frame of the station, and the station acquiring the relevant parameters of the destination wireless terminal point comprising the WAPI information elements upon reception of the probe response frame.

11. The method for switching the station according to claim 9, wherein the step 2 comprises:

in a local Medium Access Control, MAC, mode, the station transmitting a link authentication request frame to the destination wireless terminal point to request for authenticating a link to the destination wireless terminal point, and the destination wireless terminal point transmitting a link authentication response frame to the station in response to the link authentication request frame of the station; or in a separate MAC mode, the station transmitting a link authentication request frame to the destination access controller to request for authenticating a link to the destination access controller, and the destination access controller transmitting a link authentication response frame to the station in response to the link authentication request frame of the station.

12. The method for switching the station according to claim 9, wherein in the step 3, the suite of authentication and key management and the suite of ciphers, selected by the station, are the same as a suite of authentication and key management and a suite of ciphers selected by the station upon association with the associated access controller.

13. The method for switching the station according to claim 9, wherein the destination access controller requesting an associated access controller for a base key comprises:

the destination access controller transmitting base key request information comprising station deletion information to the associated access controller on a secure channel pre-established with the associated access controller; and the associated access controller transmitting a base key to the destination access controller, in response to the base key request information of the destination access controller, on the secure channel with the destination access controller, wherein the transmitted base key is equivalent to a base key between the station and the associated access controller or calculated from extension parameters in a unidirectional function using the base key between the station and the associated access controller, and the extension parameters are parameters known in advance to the station and the destination access controller.

14. The method for switching the station according to claim 13, wherein the associated access controller instructing an associated wireless terminal point to delete the station comprises:

the associated access controller transmitting a Control And Provisioning of Wireless Access Point, CAPWAP, station configuration request message comprising a message element of Delete station to the associated wireless terminal point according to the station deletion information in the base key request information of the destination access controller; and the associated wireless terminal point transmitting to the associated access controller a CAPWAP station configuration response message comprising a message element of Result Code indicating a result of processing the CAPWAP station configuration request message.

15. The method for switching the station according to claim 9, wherein the destination access controller instructing the destination wireless terminal point to add the station comprises:

the destination access controller transmitting to the destination wireless terminal point a Control And Provisioning of Wireless Access Point, CAPWAP, station configuration request message comprising message elements of Add Station, WAPI GB15629.11 Add Station and WAPIGB15629.11 Station Session Key, wherein a flag bit "A" in the WAPIGB15629.11 Station Session Key is set to 1 to instruct the destination wireless terminal point to disable a controlled port and forward only WLAN Authentication Infrastructure, WAI, protocol data from the corresponding station; and the destination wireless terminal point transmitting to the destination access controller a CAPWAP station configuration response message comprising a message element of Result Code indicating a result of processing the CAPWAP station configuration request message.

16. The method for switching the station according to claim 9, wherein the station and the destination access controller negotiating about a session key based upon the requested base key comprises:

the destination access controller and the station negotiating about a WLAN Authentication Infrastructure, WAI, uni-cast key based upon the base key requested from the associated access controller, which comprises: the destination wireless terminal point de-encapsulates and then forwards WAI uni-cast key negotiation data from the destination access controller encapsulated in a Control And Provisioning of Wireless Access Point, CAPWAP, data encapsulation format to the station, and encapsulates and then forwards WAI uni-cast key negotiation data from the station in the CAPWAP data encapsulation format to the destination access controller; and the destination access controller and the station announcing a WAI multi-cast key, which comprises: the destination wireless terminal point de-encapsulates and then forwards WAI multi-cast key announcement data from the destination access controller encapsulated in the CAPWAP data encapsulation format to the station, and encapsulates and then forwards WAI multi-cast key announcement data from the station in the CAPWAP data encapsulation format to the destination access controller.

17. The method for switching the station according to claim 9, wherein the synchronizing the session key between the destination access controller and the destination wireless terminal point comprises:

the destination access controller transmitting to the destination wireless terminal point a Control And Provisioning of Wireless Access Point, CAPWAP, station configuration request message comprising message elements of Add station, WAPIGB15629.11 Add Station, WAPIGB15629.11 Station Session Key and WAPIGB15629.11 information element, and the destination wireless terminal point enabling a controlled port corresponding to the station according to the MAC address of the station in the message element of Add Station and forwarding all the data comprising WLAN Authentication Infrastructure, WAI, protocol data and non-WAI protocol data from the station; and the destination wireless terminal point transmitting to the destination access controller a CAPWAP station configuration response message comprising a message element of Result Code indicating a result of processing the CAPWAP station configuration request message.

18. A method for switching a station in a Wireless local area network Privacy Infrastructure, WPI, performed by wireless terminal points in a converged Wireless Local Area Network, WLAN, wherein before the switching, the station is associated with one access controller through one wireless terminal point, after the switching, the station is associated with another one access controller through another one wireless terminal, the one access controller is referred to as an associated access controller, the another one access controller is referred to as a destination access controller, the one wireless terminal point is referred to as an associated wireless terminal point, the another one wireless terminal point is referred to as a destination wireless terminal point, and the method comprises:

re-associating the station with the destination access controller through the destination wireless terminal point;

the destination access controller requesting the associated access controller for a base key;

the associated access controller instructing the associated wireless terminal point to delete the station;

the destination access controller instructing the destination wireless terminal point to add the station;

the station and the destination access controller negotiating about a session key based upon the requested base key; and synchronizing the session key between the destination access controller and the destination wireless terminal point;

wherein the station and the destination access controller negotiating about a session key based upon the requested base key comprises:

the destination access controller and the station negotiating about a WLAN Authentication Infrastructure, WAI, uni-cast key based upon the base key requested from the associated access controller, which comprises: the destination wireless terminal point de-encapsulates and then forwards WAI uni-cast key negotiation data from the destination access controller encapsulated in a Control And Provisioning of Wireless Access Point, CAPWAP, data encapsulation format to the station, and encapsulates and then forwards WAI uni-cast key negotiation data from the station in the CAPWAP data encapsulation format to the destination access controller; and the destination access controller and the station announcing a WAI multi-cast key, which comprises: the destination wireless terminal point de-encapsulates and then forwards WAI multi-cast key announcement data from the destination access controller encapsulated in the CAPWAP data encapsulation format to the station, and encapsulates and then forwards WAI multi-cast key announcement data from the station in the CAPWAP data encapsulation format to the destination access controller.

19. The method for switching the station according to claim 18, wherein the destination access controller instructing the destination wireless terminal point to add the station comprises:

the destination access controller transmitting to the destination wireless terminal point a Control And Provisioning of Wireless Access Point, CAPWAP, station configuration request message comprising message elements of Add Station, WAPI Add Station and WAPI Station Session Key, wherein a flag bit "A" in the WAPI Station Session Key is set to 1 to instruct the destination wireless terminal point to disable a controlled port and forward only WLAN Authentication Infrastructure, WAI, protocol data from the corresponding station; and the destination wireless terminal point transmitting to the destination access controller a CAPWAP station configuration response message comprising a message element of Result Code indicating a result of processing the CAPWAP station configuration request message.

20. The method for switching the station according to claim 18, wherein the synchronizing the session key between the destination access controller and the destination wireless terminal point comprises:

the destination access controller transmitting to the destination wireless terminal point a Control And Provisioning of Wireless Access Point, CAPWAP, station configuration request message comprising message elements of Add station, WAPI Add Station, WAPI Station Session Key and WAPI information element, and the destination wireless terminal point enabling a controlled port corresponding to the station according to the MAC address of the station in the message element of Add Station and forwarding all the data comprising WLAN Authentication Infrastructure, WAI, protocol data and non-WAI protocol data from the station; and the destination wireless terminal point transmitting to the destination access controller a CAPWAP station configuration response message comprising a message element of Result Code indicating a result of processing the CAPWAP station configuration request message.

* * * * *